UNITED STATES PATENT OFFICE.

HARRY F. WATSON, OF ERIE, PENNSYLVANIA.

FIREPROOFING COMPOUND.

SPECIFICATION forming part of Letters Patent No. 361,196, dated April 12, 1887.

Application filed August 7, 1885. Renewed August 19, 1886. Serial No. 211,340. (No specimens.)

*To all whom it may concern:*

Be it known that I, HARRY F. WATSON, of Erie, in the county of Erie and State of Pennsylvania, have invented certain new and useful Improvements in Fireproofing Wool, Felt, Paper, and other Materials, of which the following is a full, clear, and exact description.

My invention is applicable to the treatment of wool, woolen fabric, paper, deafening-felts, and other materials of like character.

In preparing to treat the materials I provide the following solution: acetate of lead, two parts; acetate of lime, one part; chloride of ammonia, two parts; sulphate of ammonia, four parts; sulphate of alumina, one part. The material to be treated is passed through this solution, or the solution applied thereto, either by hand or by mechanism of any appropriate character, and dried either naturally or by artificial means. If desired, the material may be repeatedly treated with the solution to insure its thorough incorporation therein.

When treated with the solution above described, the materials are found to possess the quality of resisting fire in a remarkable degree.

Having thus described my invention, what I claim is—

A solution for fireproofing paper, wool, and like material, consisting of acetate of lead, acetate of lime, chloride of ammonia, sulphate of ammonia, and sulphate of alumina, in proportions substantially such as herein specified.

HARRY F. WATSON.

Witnesses:
J. H. ARMSTRONG,
R. B. HILLS.